(12) United States Patent
Maeda et al.

(10) Patent No.: US 12,525,503 B2
(45) Date of Patent: Jan. 13, 2026

(54) COMPOSITE MATERIAL, HEAT SPREADER AND SEMICONDUCTOR PACKAGE

(71) Applicants: SUMITOMO ELECTRIC INDUSTRIES, LTD., Osaka (JP); A.L.M.T. Corp., Tokyo (JP)

(72) Inventors: Toru Maeda, Osaka (JP); Miki Miyanaga, Osaka (JP); Daisuke Kondo, Osaka (JP); Masayuki Ito, Yamagata (JP); Shin-ichi Yamagata, Toyama (JP)

(73) Assignees: Sumitomo Electric Industries, Ltd., Osaka (JP); A.L.M.T. Corp., Tokyo (JP)

( * ) Notice: Subject to any disclaimer, the term of this patent is extended or adjusted under 35 U.S.C. 154(b) by 415 days.

(21) Appl. No.: 18/017,970

(22) PCT Filed: Jul. 13, 2021

(86) PCT No.: PCT/JP2021/026256
§ 371 (c)(1),
(2) Date: Jan. 25, 2023

(87) PCT Pub. No.: WO2022/030197
PCT Pub. Date: Feb. 10, 2022

(65) Prior Publication Data
US 2023/0352363 A1 Nov. 2, 2023

(30) Foreign Application Priority Data
Aug. 6, 2020 (JP) .................................. 2020-133776

(51) Int. Cl.
*H01L 23/373* (2006.01)
*F28F 21/08* (2006.01)

(52) U.S. Cl.
CPC ........ *H01L 23/3735* (2013.01); *F28F 21/085* (2013.01); *F28F 2255/06* (2013.01)

(58) Field of Classification Search
None
See application file for complete search history.

(56) References Cited

U.S. PATENT DOCUMENTS

2006/0091552 A1* 5/2006 Breit ................... H01L 23/3735
257/E23.109
2021/0066159 A1 3/2021 Tomida et al.

FOREIGN PATENT DOCUMENTS

CN 105563934 A * 5/2016
CN 111261594 A * 6/2020
(Continued)

OTHER PUBLICATIONS

Machine Translation of KR-10153438-B1 (Year: 2015).*
Machine translation of CN-105563934-A (Year: 2016).*
Machine translation of CN-111261594-A (Year: 2020).*

*Primary Examiner* — Erik Kielin
(74) *Attorney, Agent, or Firm* — Renner, Otto, Boisselle & Sklar, LLP

(57) ABSTRACT

A composite material includes a plurality of first layers and a plurality of second layers. The total number of the first and second layers is 5 or more. The first and second layers are stacked alternately in the thickness direction of the composite material, such that the first layer is located at each of the first and second surfaces. The first layers are formed from a metal material containing copper as a main component. The second layer includes a molybdenum plate and a coper filler. The molybdenum plate has first and second faces that are each an end face in the thickness direction, and a plurality of openings extending through the molybdenum plate from the first face to the second face.

12 Claims, 11 Drawing Sheets

(56) References Cited

FOREIGN PATENT DOCUMENTS

| | | | |
|---|---|---|---|
| JP | 2018-018976 A | 2/2018 | |
| JP | 2018-182088 A | 11/2018 | |
| KR | 101535438 B1 * | 7/2015 | ......... H01L 23/3735 |
| WO | 2019/208577 A1 | 10/2019 | |

* cited by examiner

COMPOSITE MATERIAL, HEAT SPREADER AND SEMICONDUCTOR PACKAGE

TECHNICAL FIELD

The present disclosure relates to a composite material, a heat spreader and a semiconductor package. The present application claims priority to Japanese Patent Application No. 2020-133776 filed on Aug. 6, 2020. The disclosure of this Japanese patent application is herein incorporated by reference in its entirety.

BACKGROUND ART

PTL 1 (Japanese Patent Laying-Open No. 2018-18976) discloses a heat dissipation substrate. The heat dissipation substrate disclosed in PTL 1 includes a core base, a first thermally conductive member, and a second thermally conductive member. The core base is formed from molybdenum (Mo). The first thermally conductive member and the second thermally conductive member are formed from copper (Cu). The core base has a first surface and a second surface opposite to the first surface. The first thermally conductive member and the second thermally conductive member are disposed on the first surface and the second surface, respectively.

The core base has an opening extending through the core base in the direction from the first surface to the second surface. An insert member is disposed inside the opening. The insert member is formed from copper.

CITATION LIST

Patent Literature

PTL 1: Japanese Patent Laying-Open No. 2018-18976

SUMMARY OF INVENTION

A composite material of the present disclosure is in a plate shape and has a first surface and a second surface that is an opposite surface to the first surface. The composite material includes a plurality of first layers and a plurality of second layers. A total number of the first layers and the second layers is 5 or more. The first layers and the second layers are stacked alternately in a thickness direction of the composite material, such that the first layer is located at each of the first surface and the second surface. The first layers are formed from a metal material containing copper as a main component. The second layers include a molybdenum plate and a copper filler. The molybdenum plate has a first face and a second face that are each an end face in the thickness direction, and a plurality of openings extending through the molybdenum plate from the first face to the second face. The copper filler is disposed inside the openings. The thickness of the first layer located at the first surface is 0.025 mm or more and 30 percent or less of a thickness of the composite material. The thickness of the second layer abutting on the first layer located at the first surface is 0.05 mm or more and 35 percent or less of the thickness of the composite material. The number of the openings is 2 or more and 12 or less per an area of 1 mm² of the first surface. A ratio between an average of the maximum value of the equivalent circle diameter of the openings, and the thickness of the second layer, is 0.3 or more and 5.0 or less.

DETAILED DESCRIPTION

Figure 1:
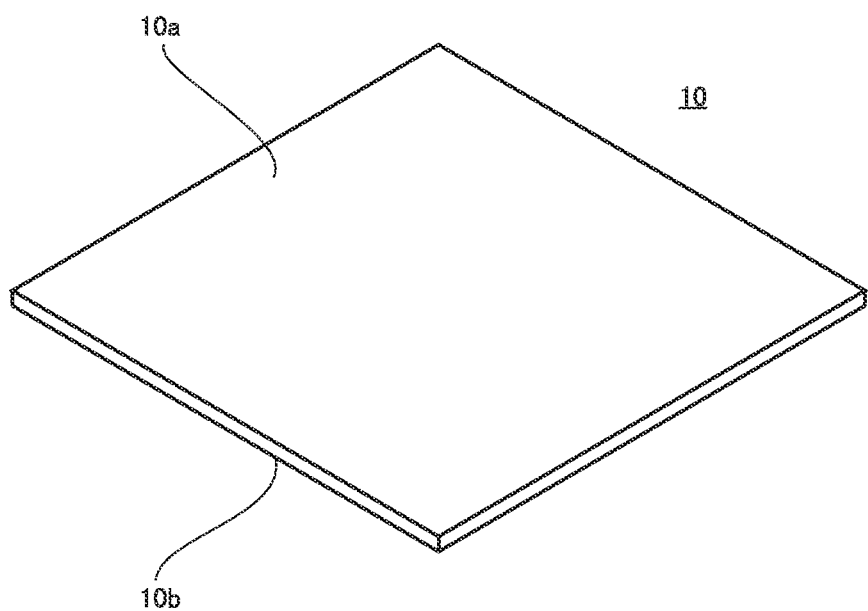
FIG. 1 is a perspective view of a composite material 10.

Problem to be Solved by the Present Disclosure

The heat dissipation substrate disclosed in PTL 1 has room for improvement in achieving both a low linear expansion coefficient and a high heat dissipation capacity.

The present disclosure is made in view of the problem of the conventional art as described above. More specifically, the present disclosure provides a composite material capable of achieving both a low linear expansion coefficient and a high heat dissipation capacity.

Advantageous Effect of the Present Disclosure

The composite material of the present disclosure enables both a low linear expansion coefficient and a high heat dissipation capacity to be achieved.

Description of Embodiments of the Present Disclosure

First, embodiments of the present disclosure are described one by one.

(1) A composite material according to one embodiment is in a plate shape and has a first surface and a second surface that is an opposite surface to the first surface. The composite material includes a plurality of first layers and a plurality of second layers. A total number of the first layers and the second layers is 5 or more. The first layers and the second layers are stacked alternately in a thickness direction of the composite material, such that the first layer is located at each of the first surface and the second surface. The first layers are formed from a metal material containing copper as a main component. The second layers include a molybdenum plate and a copper filler. The molybdenum plate has a first face and a second face that are each an end face in the thickness direction, and a plurality of openings extending through the molybdenum plate from the first face to the second face. The copper filler is disposed inside the openings. The thickness of the first layer located at the first surface is 0.025 mm or more and 30 percent or less of a thickness of the composite material. The thickness of the second layer abutting on the first layer located at the first surface is 0.05 mm or more and 35 percent or less of the thickness of the composite material. The number of the openings is 2 or more and 12 or less per an area of 1 mm$^2$ of the first surface. A ratio between an average of the maximum value of the equivalent circle diameter of the openings, and the thickness of the second layer, is 0.3 or more and 5.0 or less.

The composite material of (1) as specified above enables both a low linear expansion coefficient and a high heat dissipation capacity to be achieved.

(2) Regarding the composite material of (1) as specified above, the ratio between the average of the maximum value of the equivalent circle diameter of the openings, and the thickness of the second layer, may be 1.6 or more and less than 5.0.

(3) Regarding the composite material of (1) or (2) as specified above, a thermal conductivity in the thickness direction at room temperature may be 290 W/m·K or more. A linear expansion coefficient in an intra-layer direction orthogonal to the thickness direction, for a temperature change from room temperature to 800° C., may be 9.0 ppm/K or less.

4) Regarding the composite material of (3) as specified above, an end temperature difference may be 50° C. or less.

(5) Regarding the composite material of (1) or (2) as specified above, the thermal conductivity in the thickness direction at room temperature may be 300 W/m·K or more. A linear expansion coefficient in an intra-layer direction orthogonal to the thickness direction, for a temperature change from room temperature to 800° C., may be 8.5 ppm/K or less.

(6) Regarding the composite material of (5) as specified above, an end temperature difference may be 40° C. or less.

(7) Regarding the composite material of (1) to (6) as specified above, an average of respective equivalent circle diameters of the openings in the first face and an average of respective equivalent circle diameters of the openings in the second face may each be 0.05 mm or more and 0.35 mm or less.

(8) Regarding the composite material of (1) to (7) as specified above, an average of respective minimum opening areas of the opening may be 57 percent or more and 100 percent or less, relative to an average of respective maximum opening areas of the openings.

(9) Regarding the composite material of (1) to (8) as specified above, the total number of the first layers and the second layers may be 9 or less.

(10) A heat spreader according to one embodiment includes the composite material of (1) to (9) as specified above. The first surface of the composite material is a contact surface to abut on a heat generation source.

(11) A semiconductor package according to one embodiment includes the composite material of (1) to (9) as specified above, and a semiconductor device disposed on the first surface of the composite material.

(12) The semiconductor package of (11) as specified above may further include a case member formed from a ceramic material. The case member is disposed on the first surface and surrounds the semiconductor device.

Details of Embodiments of the Present Disclosure

Next, details of embodiments of the present disclosure are described with reference to the drawings. In the following drawings, the same or corresponding parts are denoted by the same reference characters, and a description thereof is not herein repeated.

(Configuration of Composite Material According to Embodiment)

In the following, a configuration of a composite material according to an embodiment (hereinafter denoted as "composite material 10") is described.

FIG. 1 is a perspective view of a composite material 10. As shown in FIG. 1, composite material 10 has a plate-like shape. Composite material 10 has a first surface 10*a* and a second surface 10*b*. First surface 10*a* and second surface 10*b* are each an end face in the thickness direction of composite material 10. Specifically, second surface 10*b* is an opposite surface to first surface 10*a* in the thickness direction of composite material 10.

Figure 2:
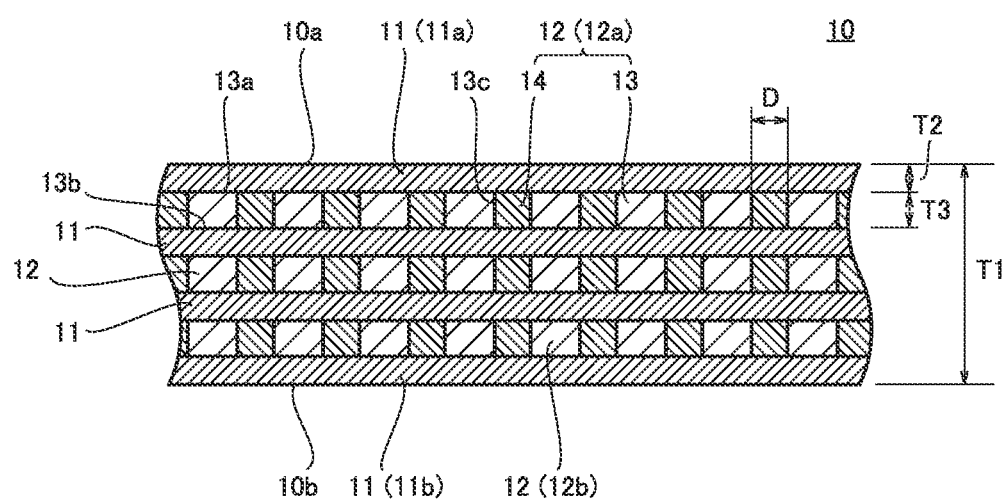
FIG. 2 is a cross-sectional view of composite material 10.

FIG. 2 is a cross-sectional view of composite material 10. As shown in FIG. 2, composite material 10 includes a plurality of first layers 11 and a plurality of second layers 12. In the example shown in FIG. 2, the number of first layers 11 is four, the number of second layers 12 is three, and thus the total number of first layers 11 and second layers 12 is seven.

First layers 11 and second layers 12 are stacked alternately in the thickness direction of composite material 10, such that one of first layers 11 is located at first surface 10*a* and another one of first layers 11 is located at second surface 10*b*. Second layers 12 are placed between the two first layers 11 in the thickness direction of composite material 10. The thickness of composite material 10 is herein denoted as thickness T1.

First layers 11 are formed from a metal material containing copper as a main component. "Metal material containing copper as a main component" herein refers to a metal material having a copper content of 50 percent by mass or more. The metal material containing copper as a main component is preferably a copper alloy having a copper content of 70 percent by mass or more. First layers 11 are formed from pure copper, for example. The pure copper refers to a metal material composed of copper and inevitable impurities constituting the balance.

Among first layers 11, the first layer located at first surface 10*a* is herein denoted as first layer 11*a*. Among first layers 11, the first layer located at second surface 10*b* is herein denoted as first layer 11*b*. The thickness of first layer 11 is herein denoted as thickness T2. Thickness T2 of first layer 11*a* (first layer 11*b*) is 0.025 mm or more and 30 percent or less of thickness T1.

Second layer 12 includes a molybdenum plate 13 and a copper filler 14. Molybdenum plate 13 is formed from a metal material containing molybdenum as a main component. "Metal material containing molybdenum as a main component" refers to a metal material having a molybdenum content of 50 percent by mass or more. The metal material containing molybdenum as a main component preferably has a molybdenum content of 70 percent by mass or more. Molybdenum plate 13 is formed from pure molybdenum, for example. The pure molybdenum refers to a metal material composed of molybdenum and inevitable impurities constituting the balance. Copper filler 14 is formed from a metal material containing copper as a main component. Copper filler 14 is formed from pure copper, for example. Copper filler 14 is preferably formed from the same material as first layers 11.

Molybdenum plate 13 is a plate-like body. Molybdenum plate 13 has a first face 13*a* and a second face 13*b*. First face 13*a* and second face 13*b* are each an end face in the thickness direction of composite material 10. Specifically, second face 13b is an opposite face to first face 13a in the thickness direction of composite material 10.

Molybdenum plate 13 has a plurality of openings 13c. Openings 13c each extend through molybdenum plate 13 in the direction from first face 13a to second face 13b. The number of openings 13c per an area of 1 mm² of first surface 10a (second surface 10b) (the value determined by dividing the total number of openings 13c by the area of first surface 10a (second surface 10b)) is 2 or more and 12 or less. Copper filler 14 is disposed inside openings 13c.

Among second layers 12, the second layer abutting on first layer 11a is herein denoted as second layer 12a. Among second layers 12, the second layer abutting on first layer 11b is herein denoted as second layer 12b. The thickness of second layer 12 is herein denoted as thickness T3. Thickness T3 of second layer 12a (second layer 12b) is 0.05 mm or more and 35 percent or less of thickness T1.

Figure 3:
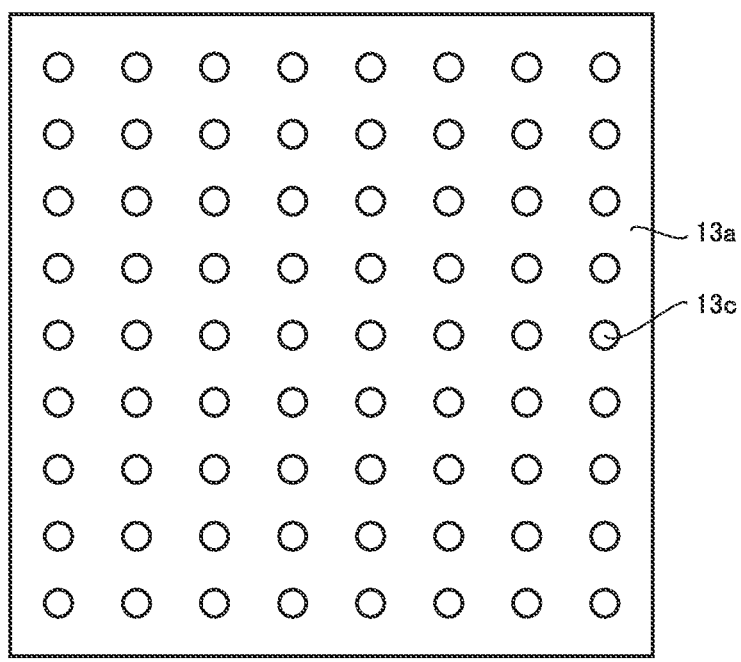
FIG. 3 is a plan view of a molybdenum plate 13.

FIG. 3 is a plan view of molybdenum plate 13. As shown in FIG. 3, openings 13c each have a circular shape as seen in plan view. The shape of each opening 13c as seen in plan view, however, is not limited to the circular shape. Openings 13c each may have an elliptical shape, a polygonal shape, or any of other shapes, for example. The equivalent circle diameter of each opening 13c as seen in plan view is herein denoted as opening diameter D. Opening diameter D is obtained by calculating the square root of the value determined by dividing the area of opening 13c as seen in plan view by π/4.

Opening diameter D may be constant throughout the range between first face 13a and second face 13b. Opening diameter D may vary between first face 13a and second face 13b, and thus may not be constant between first face 13a and second face 13b. In the case of opening diameter D that varies between first face 13a and second face 13b, this opening diameter D may decrease from one of first face 13a and second face 13b toward the other of first face 13a and second face 13b. In a certain opening, the maximum value of opening diameter D in the thickness direction is herein denoted as opening diameter $D_{max}$.

The average of opening diameter $D_{max}$ (the value determined by dividing the sum of respective opening diameters $D_{max}$ of all openings 13c by the total number of openings 13c) is herein defined as average equivalent circle diameter. For one second layer 12, the value determined by dividing the average equivalent circle diameter by thickness T3, i.e., the ratio between the average equivalent circle diameter and thickness T3, is 0.3 or more and 5.0 or less. The ratio between the average equivalent circle diameter and thickness T3 is preferably 1.6 or more and less than 5.0.

Preferably, the average of opening diameter D in first face 13a (the value determined by dividing the sum of respective opening diameters D of all openings 13c in first face 13a by the total number of openings 13c) and the average of opening diameter D in second face 13b (the value determined by dividing the sum of respective opening diameters D of all openings 13c in second face 13b by the total number of openings 13c) are each 0.05 mm or more and 0.35 mm or less.

The opening area of opening 13c is measured in a plane parallel to first face 13a. The minimum value of the opening area of opening 13c measured across the range from first face 13a to second face 13b in the thickness direction of molybdenum plate 13 is herein denoted as minimum opening area of opening 13c. The maximum value of the opening area of opening 13c measured across the range from first face 13a to second face 13b in the thickness direction of molybdenum plate 13 is herein denoted as maximum opening area of opening 13c. More preferably, the average of the minimum opening area of openings 13c (the value determined by dividing the sum of respective minimum opening areas of all openings 13c by the total number of openings 13c) is more preferably 57 percent or more and 100 percent or less of the average of the maximum opening area of openings 13c (the value determined by dividing the sum of respective maximum opening areas of all openings 13c by the total number of openings 13c).

The thermal conductivity in the thickness direction of composite material 10 at room temperature is preferably 290 W/m·K or more. The thermal conductivity in the thickness direction of composite material 10 at room temperature is preferably 300 W/m·K or more. "Room temperature" herein refers to 27° C.

The thermal conductivity in the thickness direction of composite material 10 is measured by means of the laser flash method. With the laser flash method, the thermal diffusivity of composite material 10 is measured by means of LFA 457 MicroFlash (manufactured by NETZSCH), and the thermal conductivity in the thickness direction of composite material 10 is calculated based on the thermal diffusivity as well as the volume and the specific heat of each constituent material forming composite material 10. For the calculation of the thermal conductivity, the specific heat of each constituent material is determined based on "Metal Data Book 4th Edition," The Japan Institute of Metals and Materials (Maruzen Publishing Co., Ltd., 2004). Prior to measuring the thermal conductivity of composite material 10, the thermal conductivity of a pure copper sample of the same shape is measured under the same conditions, and the measured thermal conductivity is used as a reference to correct the measured thermal conductivity of the composite material.

Figure 4A:
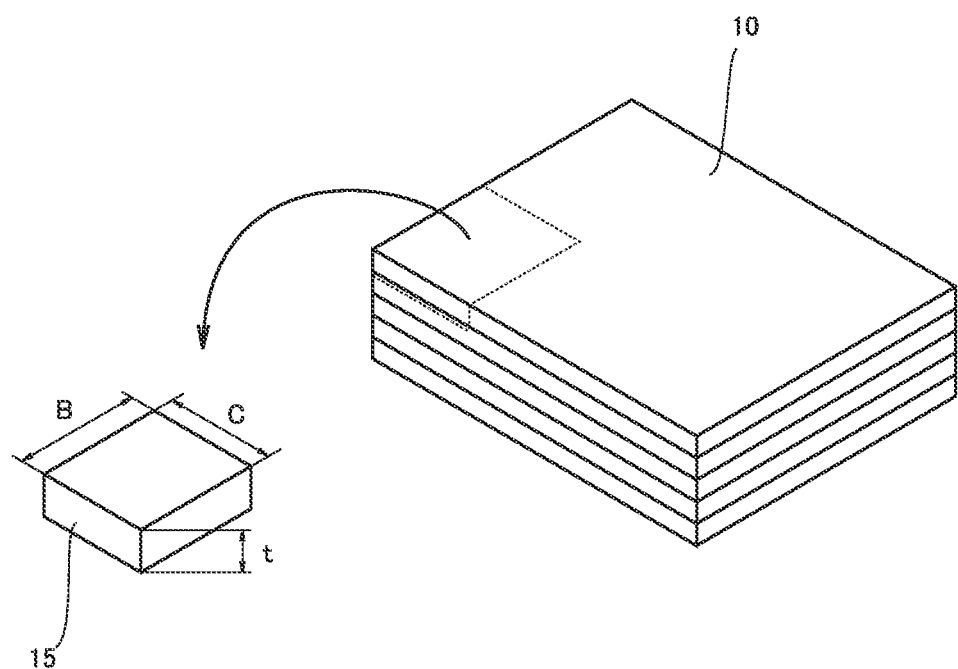
FIG. 4A is a first illustrative diagram illustrating a procedure of preparing a measurement sample for measuring the thermal conductivity in the thickness direction of composite material 10.

FIG. 4A is a first illustrative diagram illustrating a procedure of preparing a measurement sample for measuring the thermal conductivity in the thickness direction of composite material 10, As shown in FIG. 4A, from composite material 10 to be measured, a thin piece 15 is cut out. The thickness, the length and the width of thin piece 15 are denoted as t (mm), B (mm) and C (mm), respectively.

The value determined by dividing 2 by t is rounded up to the nearest integer, and the resultant number is herein denoted as X. The value determined by dividing 10 by B is rounded up to the nearest integer, and the resultant number is herein denoted as Y1. The value determined by dividing 10 by C is rounded up to the nearest integer, and the resultant number is herein denoted as Y2. From composite material 10 to be measured, thin pieces 15 of which number is equal to the product of X, Y1 and Y2 are cut out.

Figure 4B:
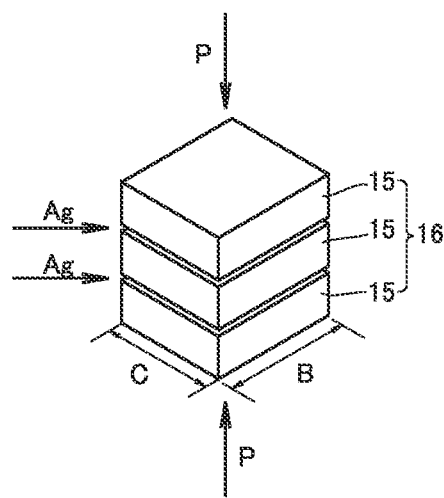
FIG. 4B is a second illustrative diagram illustrating the procedure of preparing a measurement sample for measuring the thermal conductivity in the thickness direction of composite material 10.

FIG. 4B is a second illustrative diagram illustrating the procedure of preparing a measurement sample for measuring the thermal conductivity in the thickness direction of composite material 10. As shown in FIG. 4B, a block 16 is produced from X sheets of thin pieces 15. The thickness, the length and the width of block 16 are about 2 (mm), B (ram) and C (mm), respectively. For producing block 16, firstly X sheets of thin pieces 15 are stacked together. At this time, pure silver powder having indefinite shape and an average particle size of 4 μm is placed between thin pieces 15 adjacent to each other. The amount of the indefinite-shape powder placed between thin pieces 15 adjacent to each other is 0.2 g±30 percent per 100 mm².

For producing block 16, secondly a rectangular mold (not shown) in which an opening with the inner dimensions of B (mm)×C (mm) is formed is prepared, and stacked thin pieces 15 are disposed in the opening. This mold is made from graphite. For producing block 16, thirdly stacked thin pieces 15 are subjected to heat treatment with a load P applied thereto. Load P is 4.9 N or more and 9.8 N or less. The heat treatment is performed in an inert gas atmosphere. The heat treatment is performed at a holding temperature of 900° C. for a holding time of 10 minutes. The heat treatment causes the indefinite-shape powder to soften and deform, so that adjacent thin pieces 15 are bonded together, and accordingly block 16 is produced.

Figure 4C:
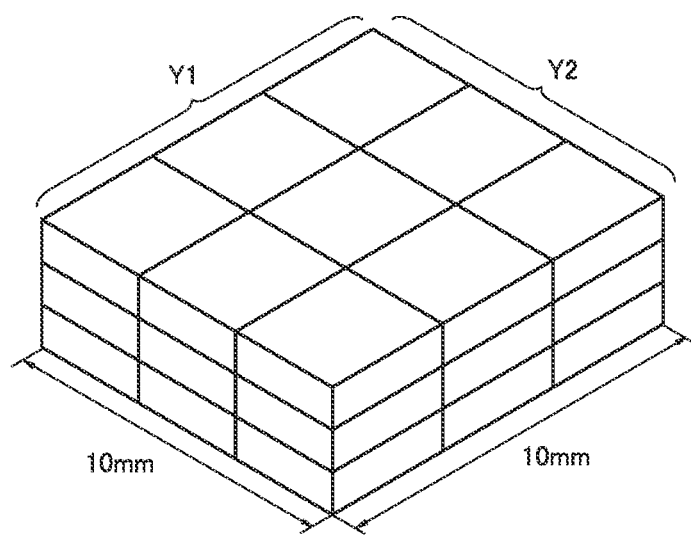
FIG. 4C is a third illustrative diagram illustrating the procedure of preparing a measurement sample for measuring the thermal conductivity in the thickness direction of composite material 10.

FIG. 4C is a third illustrative diagram illustrating the procedure of preparing a measurement sample for measuring the thermal conductivity in the thickness direction of composite material 10. As shown in FIG. 4C, blocks 16 are arranged such that Y1 pieces of blocks 16 are arranged lengthwise and Y2 pieces of blocks 16 are arranged widthwise, which produces a measurement sample 17 having a height of about 10 mm, a width of about 10 mm, and a thickness of about 2 mm. When Y1 pieces of blocks 16 are arranged lengthwise and Y2 pieces of blocks 16 are arranged widthwise, blocks 16 adjacent to each other are bonded to each other by a bonding member. A bonding member resistant to a temperature of approximately 800° C. such as silver brazing foil, ceramic adhesive, or the like is used. Y1 pieces of blocks 16 arranged lengthwise and Y2 pieces of blocks 16 arranged widthwise may be fixed with a stainless wire or the like wound around their outer periphery.

The linear thermal expansion coefficient in the intra-layer direction (direction orthogonal to the thickness direction) of composite material 10, for a temperature change from room temperature to 800° C., is preferably 9.0 ppm/K or less. The linear thermal expansion coefficient in the intra-layer direction of composite material 10, for a temperature change from room temperature to 800° C., is more preferably 8.5 ppm/K or less.

The linear thermal expansion coefficient in the intra-layer direction of composite material 10, for a temperature change from room temperature to 800° C., is calculated by measuring, by means of TDS 5000SA (manufactured by Bruker AXS), the expansion displacement in the intra-layer direction of composite material 10, in a temperature range from room temperature to 800° C. When the linear thermal expansion coefficient in the intra-layer direction of composite material 10, for a temperature change from room temperature to 800° C., is calculated, the shape of composite material 10 as seen in plan view is a rectangular shape of 3 mm×15 mm. The measurement value is the average of three samples.

Figure 5:
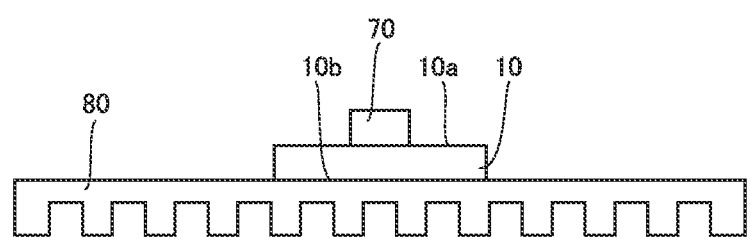
FIG. 5 is an illustrative diagram illustrating a method of evaluating the heat dissipation capacity of composite material 10.

The end temperature difference of composite material 10 is preferably 50° C. or less. The end temperature difference of composite material 10 is more preferably 40° C. or less. FIG. 5 is an illustrative diagram illustrating a method of evaluating the heat dissipation capacity of composite material 10. FIG. 5 schematically shows a state as seen from one side surface of composite material 10. As seen in the direction perpendicular to first surface 10a, composite material 10 is cut in a rectangular shape of 10 mm×10 mm. A heat generator 70 is placed in contact with the center of first surface 10a of the cut composite material 10. Heat generator 70 has a rectangular shape of 10 mm×10 mm as seen in the direction perpendicular to first surface 10a. The amount of heat generated from heat generator 70 is 50 W.

An aluminum fin 80 is bonded to second surface 10b of the cut composite material 10, with silicone oil (G-751 manufactured by Shin-Etsu Chemical Co., Ltd.). This bonding is done with the silicone oil disposed between aluminum fin 80 and second surface 10b of the cut composite material 10, to which a load of 9.8 N is applied.

The temperature at the interface between heat generator 70 and first surface 10a of the cut composite material 10 is herein denoted as first temperature. The temperature at an end (corner) of first surface 10a of the cut composite material 10 is herein denoted as second temperature. The temperature at the interface between aluminum fin 80 and second surface 10b of the cut composite material 10 is herein denoted as third temperature. The first temperature, the second temperature and the third temperature are measured by means of a thermocouple (not shown). Air cooling of aluminum fin 80 is controlled such that the third temperature is 25° C.±3° C. The ambient temperature of an environment for measurement is 25° C.±5° C.

The end temperature difference of composite material 10 is the difference between the first temperature and the second temperature (first temperature−second temperature) when the temperature reaches a steady state after 30 seconds or more from the time heat generator 70 is brought into contact with first surface 10a, of the cut composite material 10. As the end temperature difference, an average of respective end temperature differences obtained from measurement made ten times is taken, Specifically, the end temperature difference of composite material 10 is the difference between the temperature of a portion of first surface 10a on which heat generator 70 abuts and the temperature of an end (corner) of first surface 10a, in the state where heat generator 70 abuts on first surface 10a and aluminum fin 80 is bonded to second surface 10b. The smaller the end temperature difference, the higher the thermal conductivity in the intra-layer direction of composite material 10.

Modifications

Figure 6:
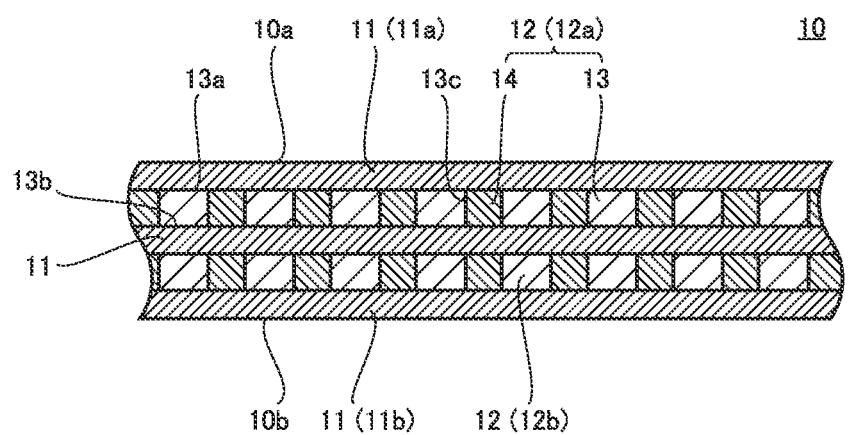
FIG. 6 is a cross-sectional view of composite material 10 according to a first modification.
Figure 7:
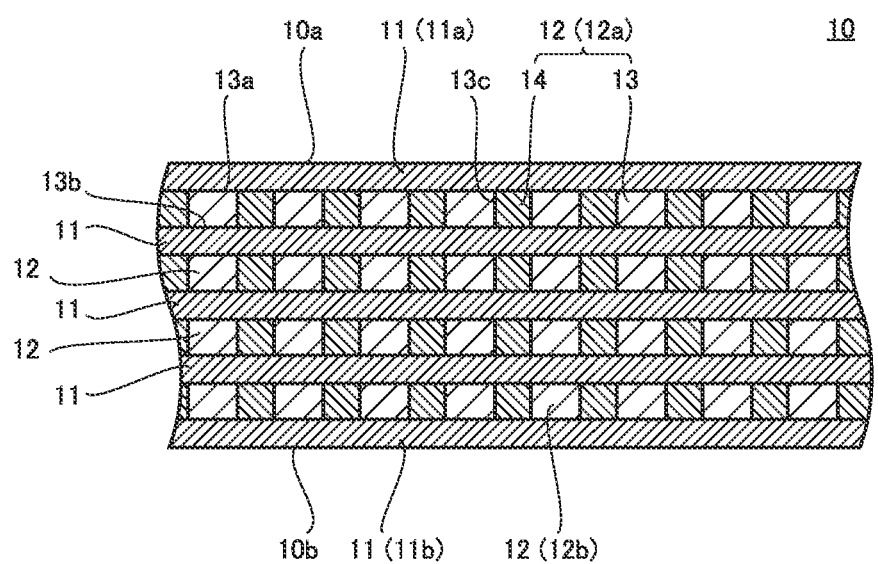
FIG. 7 is a cross-sectional view of composite material 10 according to a second modification.

FIG. 6 is a cross-sectional view of composite material 10 according to Modification 1. FIG. 7 is a cross-sectional view of composite material 10 according to Modification 2. As shown in FIG. 6, the total of the number of first layers 11 and the number of second layers 12 may be 5. As shown in FIG. 7, the total of the number of first layers 11 and the number of second layers 12 may be 9.

(Method of Manufacturing Composite Material According to Embodiment)

In the following, a method of manufacturing composite material 10 is described.

Figure 8:
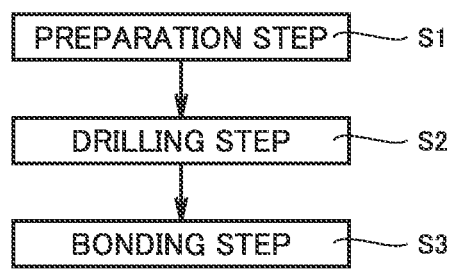
FIG. 8 is a flowchart showing a method of manufacturing composite material 10.

FIG. 8 is a flowchart showing a method of manufacturing composite material 10. The method of manufacturing composite material 10 includes, as shown in FIG. 8, a preparation step S1, a drilling step S2, and a bonding step S3.

In preparation step S1, a first plate and a second plate are prepared. The first plate is a plate formed from a metal material containing copper as a main component. The second plate is formed from a metal material containing molybdenum as a main component.

In drilling step S2, drilling of the second plate is performed. The drilling forms a plurality of openings extending in the thickness direction through the second plate. As a result, the second plate is provided to serve as molybdenum plate 13. The drilling of the second plate is performed through etching or laser irradiation, for example.

In bonding step S3, firstly the first plate(s) and molybdenum plate(s) 13 are stacked alternately in a mold (the first plate(s) and molybdenum plate(s) 13 that are stacked alternately are hereinafter referred to as a multilayer body). The mold is formed from graphite, for example. The first plate(s)

and molybdenum plate(s) 13 are stacked together such that the first plate is located at a surface of the multilayer body.

In bonding step S3, secondly the multilayer body is heated and pressurized. The heating temperature is set to a temperature that is less than the melting point of the first plate and softens the first plate sufficiently. The heating temperature is 1000° C., for example. The pressurizing is performed in the thickness direction of the multilayer body. The pressurizing is done with a pressure necessary for flowing the first plate softened by being heated. The pressurizing is done with a pressure of 50 MPa, for example.

The heating and the pressurizing cause the first plate to flow, and consequently cause the first plate to fill openings 13c of molybdenum plate 13 and thus serve as copper filler 14. The remainder of the first plate that has not filled openings 13c forms first layer 11.

(Configuration of Semiconductor Package According to Embodiment)

In the following, a configuration of a semiconductor package according to an embodiment (hereinafter denoted as "semiconductor package 100") is described.

Figure 9:
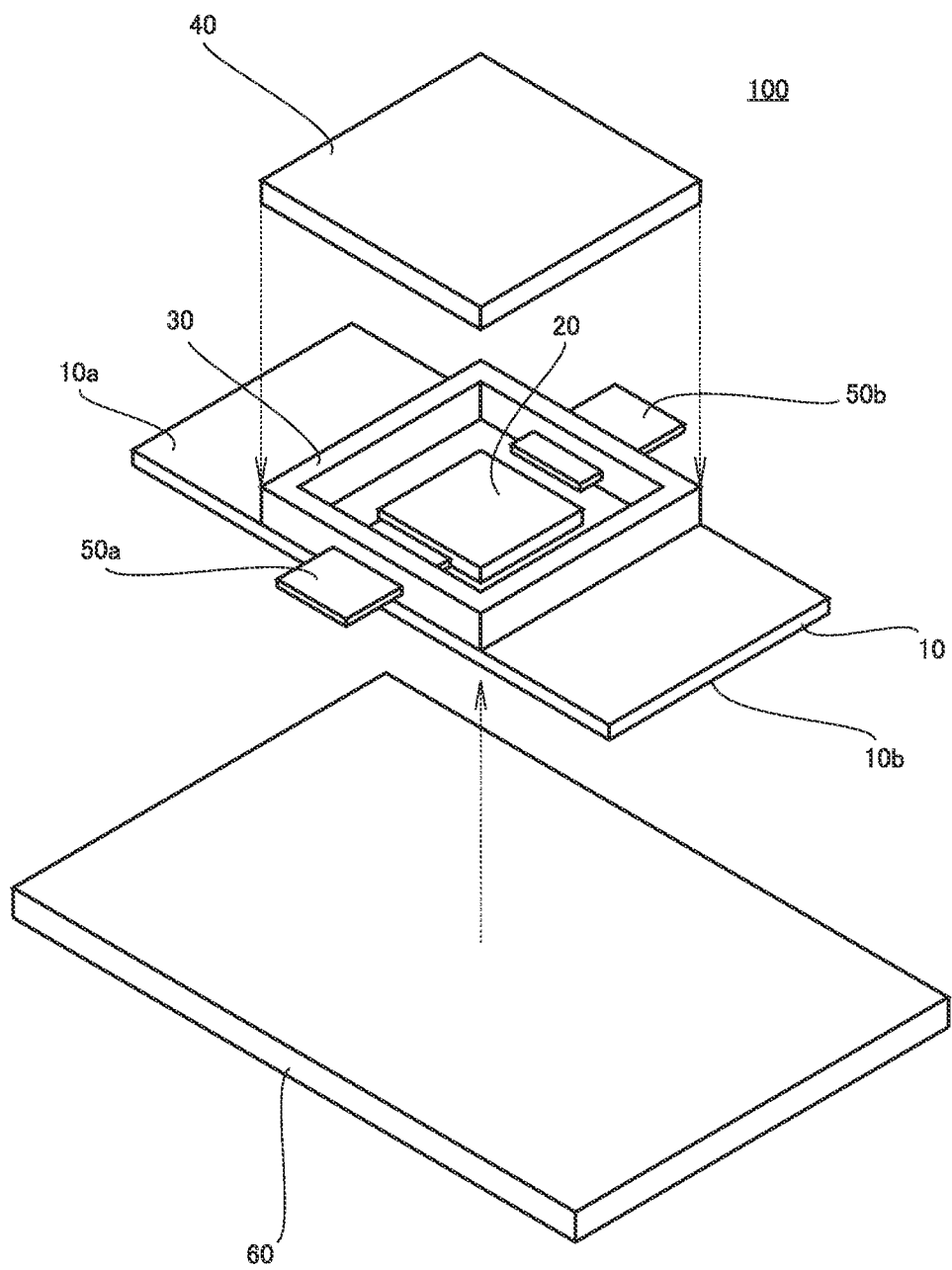
FIG. 9 is an exploded perspective view of a semiconductor package 100.

FIG. 9 is an exploded perspective view of a semiconductor package 100. As shown in FIG. 9, semiconductor package 100 includes composite material 10, a semiconductor device 20, a case member 30, a lid 40, a terminal 50a and a terminal 50b.

Composite material 10 functions as a heat spreader in semiconductor package 100. Semiconductor device 20 is disposed on first surface 10a. A heat transfer member may be interposed between semiconductor device 20 and first surface 10a. In operation, semiconductor device 20 is a heat generation source.

Case member 30 is formed from a ceramic material, for example. The ceramic material is alumina ($Al_2O_3$), for example, Case member 30 is disposed on first surface 10a and surrounds semiconductor device 20. The lower end of case member 30 (the end on the first surface 10a side) and first surface 10a are bonded to each other by brazing, for example. Lid 40 is formed from a ceramic material or a metal material, for example. Lid 40 closes the upper end-side of case member 30.

Terminal 50a and terminal 50b are inserted in case member 30. As a result, one end of each of terminal 50a and terminal 50b is located in the space defined by first surface 10a, case member 30 and lid 40, and the other end of each of terminal 50a and terminal 50b is located outside the above-identified space. Terminal 50a and terminal 50b are formed from a metal material, for example. The metal material is Kovar, for example.

The one end of each of terminal 50a and terminal 50b is electrically connected (not shown) to semiconductor device 20. At the other end of each of terminal 50a and terminal 50b, semiconductor package 100 is electrically connected to a device or circuit different from semiconductor package 100.

A heat dissipation member 60 is attached to second surface 10b. Heat dissipation member 60 is a metal plate in which a flow channel is formed to allow refrigerant to pass through the flow channel, for example. Heat dissipation member 60, however, is not limited to this. Heat dissipation member 60 may be a cooling fin, for example. A heat transfer member may be interposed between heat dissipation member 60 and second surface 10b.

(Advantageous Effects of Composite Material According to Embodiment)

In the following, advantageous effects of composite material 10 are described.

In order to efficiently dissipate, from first surface 10a (second surface 10b), heat generated from a heat generation source, it is effective to cause the heat from the heat generation source to be diffused in the intra-layer direction, by increasing the thermal conductivity on the first surface 10a (second surface 10b) side.

In composite material 10, it is ensured that first layer 11a (first layer 11b) with a relatively higher thermal conductivity has thickness T2 of 0.025 mm or more. Therefore, composite material 10 enables heat from the heat generation source to be dissipated efficiently from first surface 10a (second surface 10b).

Composite material 10 is exposed to a high temperature (e.g. approximately 800° C.) when case member 30 is brazed, for example. Therefore, composite material 10 is required to have small thermal expansion when being exposed to a high temperature. In composite material 10, it is ensured that second layer 12a (second layer 12b) having a relatively lower linear expansion coefficient has thickness T3 of 0.05 mm or more. In composite material 10, thickness T2 of first layer 11a (first layer 11b) is 30 percent or less of thickness T1, and therefore, first layer 11a (first layer 11b) having a relatively higher linear expansion coefficient is prevented from being excessively thick. Thus, thermal expansion of composite material 10 when being exposed to a high temperature is suppressed.

In order to improve heat dissipation of composite material 10, enhancement of not only the thermal conductivity on the first surface 10a (second surface 10b) side, but also the thermal conductivity of the whole composite material 10 is required. However, a higher ratio of molybdenum in composite material 10 causes decrease of the thermal conductivity of composite material 10 as a whole, while reducing the linear expansion coefficient of composite material 10 as a whole.

The greater the number of openings 13c per an area of 1 $mm^2$ of first surface 10a (second surface 10b), or the larger the value determined by dividing the average equivalent circle diameter of openings 13c by thickness T3, the lower the ratio of molybdenum in composite material 10 and the lower the thermal conductivity of composite material 10 as a whole. In addition, the larger the thickness T3 of second layer 12a (second layer 12b), the larger the ratio of molybdenum in composite material 10 and the lower the thermal conductivity of composite material 10 as a whole.

In composite material 10, the number of openings 13c per an area of 1 $mm^2$ of first surface 10a (second surface 10b) is 2 or more and 12 or less, and the value determined by dividing the average equivalent circle diameter of openings 13c by thickness T3 is 0.3 or more and 5.0 or less. In composite material 10, thickness T3 of second layer 12a (second layer 12b) is 35 percent or less of thickness T1, and thus thickness T3 of second layer 12a (second layer 12b) is prevented from being excessively large. Thus, in composite material 10, the thermal conductivity and the linear expansion coefficient of composite material 10 as a whole are balanced with each other.

Accordingly, composite material 10 enables both a low linear expansion coefficient and a high heat dissipation capacity to be achieved.

EXPERIMENTAL EXAMPLES

In order to confirm the advantageous effects of composite material 10, Samples 1 to 48 were prepared. In Samples 1 to 48, first layer 11 was formed from pure copper. In Samples 1 to 48, molybdenum plate 13 was formed from pure molybdenum, and copper filler 14 was formed from pure copper.

Tables 1, 2 and 3 show the dimensions of composite material 10 in Samples 1 to 48. Thickness T2 of the first layer other than first layer 11a and first layer 11b is determined from thickness T1 of composite material 10, thickness T2 of first layer 11a and first layer 11b and thickness T3 of second layer 12, and is therefore not shown in Tables 1 to 3. In Samples 27 to 48, thickness T3 of second layer 12a and second layer 12b is equal to thickness T3 of second layer 12 other than second layer 12a and second layer 12b.

The fact that thickness T1 of first layer 11a (first layer 11b) is 0.025 mm or more and 30 percent or less of thickness T3 is herein denoted as Condition A. The fact that thickness T2 of second layer 12a (second layer 12b) is 0.05 mm or more and 30 percent or less of thickness T3 is herein denoted as Condition B.

A condition that the number of openings 13c per an area of 1 mm$^2$ of first surface 10a (second surface 10b) is 2 or more and 12 or less, is herein denoted as Condition C. A condition that the value determined by dividing the average equivalent circle diameter of openings 13c by thickness T3 is 0.3 or more and 5.0 or less, is herein denoted as Condition D. A condition that the value determined by dividing the average equivalent circle diameter of openings 13c by thickness T3 is 1.6 or more and less than 5.0, is herein denoted as Condition E.

Samples 1 to 3, 8, 12, 15, 27, 32, 39 and 43 do not satisfy at least one of Conditions A to D. The other samples satisfy all of Conditions A to D.

Samples 4 to 7, 13, 14, 18 to 22, 28 to 31, 34, 36 to 38, 40 to 42, and 44 to 48 further satisfy Condition E.

TABLE 1

| | | 1st layers 11a and 11b | | | | 2nd layer 12 | | openings 13c | | | |
|---|---|---|---|---|---|---|---|---|---|---|---|
| | number of layers | thickness T1 (mm) | thickness T2 (mm) | thickness T2/ thickness T1 | thickness T3 (mm) | thickness T3/ thickness T1 | number of openings 13c (/mm$^2$) | average equivalent circle dimeter (mm) | average equivalent circle diameter/ thickness T3 | maximum opening area S1 (mm$^2$) | minimum opening area S2 (mm$^2$) | S2/S1 |
| Sample 1 | 5 | 0.30 | 0.017 | 0.055 | 0.13 | 0.417 | 15 | 0.15 | 1.20 | 0.020 | 0.016 | 0.82 |
| Sample 2 | 5 | 0.56 | 0.017 | 0.030 | 0.25 | 0.455 | 3.8 | 0.30 | 1.20 | 0.080 | 0.066 | 0.82 |
| Sample 3 | 5 | 1.00 | 0.020 | 0.020 | 0.15 | 0.150 | 5.7 | 0.25 | 1.67 | 0.054 | 0.044 | 0.82 |
| Sample 4 | 5 | 1.00 | 0.040 | 0.040 | 0.15 | 0.150 | 5.7 | 0.25 | 1.67 | 0.054 | 0.044 | 0.82 |
| Sample 5 | 5 | 1.00 | 0.100 | 0.100 | 0.15 | 0.150 | 5.7 | 0.25 | 1.67 | 0.054 | 0.044 | 0.82 |
| Sample 6 | 5 | 1.00 | 0.250 | 0.250 | 0.15 | 0.150 | 5.7 | 0.25 | 1.67 | 0.054 | 0.044 | 0.82 |
| Sample 7 | 5 | 1.00 | 0.300 | 0.300 | 0.15 | 0.150 | 5.7 | 0.25 | 1.67 | 0.054 | 0.044 | 0.82 |
| Sample 8 | 5 | 1.00 | 0.100 | 0.100 | 0.03 | 0.030 | 5.7 | 0.25 | 8.33 | 0.054 | 0.044 | 0.82 |
| Sample 9 | 5 | 1.00 | 0.100 | 0.100 | 0.05 | 0.050 | 5.7 | 0.25 | 5.00 | 0.054 | 0.044 | 0.82 |
| Sample 10 | 5 | 1.00 | 0.100 | 0.100 | 0.30 | 0.030 | 5.7 | 0.25 | 0.83 | 0.054 | 0.044 | 0.82 |
| Sample 11 | 5 | 1.00 | 0.100 | 0.100 | 0.35 | 0.035 | 5.7 | 0.25 | 0.71 | 0.054 | 0.044 | 0.82 |
| Sample 12 | 5 | 1.00 | 0.100 | 0.100 | 0.15 | 0.150 | 1.0 | 0.25 | 1.67 | 0.054 | 0.044 | 0.82 |
| Sample 13 | 5 | 1.00 | 0.100 | 0.100 | 0.15 | 0.150 | 2.0 | 0.25 | 1.67 | 0.054 | 0.044 | 0.82 |
| Sample 14 | 5 | 1.00 | 0.100 | 0.100 | 0.15 | 0.150 | 12.0 | 0.25 | 1.67 | 0.054 | 0.044 | 0.82 |
| Sample 15 | 5 | 1.00 | 0.100 | 0.100 | 0.15 | 0.150 | 15.0 | 0.25 | 1.67 | 0.054 | 0.044 | 0.82 |
| Sample 16 | 5 | 1.00 | 0.100 | 0.100 | 0.15 | 0.150 | 5.7 | 0.05 | 0.33 | 0.0022 | 0.0018 | 0.82 |
| Sample 17 | 5 | 1.00 | 0.100 | 0.100 | 0.15 | 0.150 | 5.7 | 0.13 | 0.87 | 0.015 | 0.012 | 0.82 |
| Sample 18 | 5 | 1.00 | 0.100 | 0.100 | 0.15 | 0.150 | 5.7 | 0.33 | 2.20 | 0.094 | 0.077 | 0.82 |
| Sample 19 | 5 | 1.00 | 0.100 | 0.100 | 0.15 | 0.150 | 5.7 | 0.35 | 2.33 | 0.106 | 0.087 | 0.82 |
| Sample 20 | 5 | 1.00 | 0.100 | 0.100 | 0.15 | 0.150 | 5.7 | 0.25 | 1.67 | 0.054 | 0.054 | 1.00 |
| Sample 21 | 5 | 1.00 | 0.100 | 0.100 | 0.15 | 0.150 | 5.7 | 0.25 | 1.67 | 0.054 | 0.043 | 0.82 |
| Sample 22 | 5 | 1.00 | 0.100 | 0.100 | 0.15 | 0.150 | 5.7 | 0.25 | 1.67 | 0.054 | 0.032 | 0.82 |
| Sample 23 | 5 | 0.70 | 0.100 | 0.143 | 0.20 | 0.286 | 5.7 | 0.25 | 1.25 | 0.054 | 0.044 | 0.82 |
| Sample 24 | 5 | 0.85 | 0.100 | 0.118 | 0.20 | 0.235 | 5.7 | 0.25 | 1.25 | 0.054 | 0.044 | 0.82 |
| Sample 25 | 5 | 1.90 | 0.100 | 0.053 | 0.20 | 0.105 | 5.7 | 0.25 | 1.25 | 0.054 | 0.044 | 0.82 |
| Sample 26 | 5 | 2.00 | 0.100 | 0.050 | 0.20 | 0.100 | 5.7 | 0.25 | 1.25 | 0.054 | 0.044 | 0.82 |

TABLE 2

| | | 1st layers 11a and 11b | | | | 2nd layer 12 | | openings 13c | | | |
|---|---|---|---|---|---|---|---|---|---|---|---|
| | number of layers | thickness T1 (mm) | thickness T2 (mm) | thickness T2/ thickness T1 | thickness T3 (mm) | thickness T3/ thickness T1 | number of openings 13c (/mm$^2$) | average equivalent circle dimeter (mm) | average equivalent circle diameter/ thickness T3 | maximum opening area S1 (mm$^2$) | minimum opening area S2 (mm$^2$) | S2/S1 |
| Sample 27 | 7 | 1.00 | 0.020 | 0.020 | 0.15 | 0.150 | 5.7 | 0.25 | 1.67 | 0.054 | 0.044 | 0.82 |
| Sample 28 | 7 | 1.00 | 0.025 | 0.025 | 0.15 | 0.150 | 5.7 | 0.25 | 1.67 | 0.054 | 0.044 | 0.82 |
| Sample 29 | 7 | 1.00 | 0.100 | 0.100 | 0.15 | 0.150 | 5.7 | 0.25 | 1.67 | 0.054 | 0.044 | 0.82 |

TABLE 2-continued

| | 1st layers 11a and 11b | | | | | 2nd layer 12 | | | | | |
|---|---|---|---|---|---|---|---|---|---|---|---|
| | | | | | | | | openings 13c | | | |
| | number of layers | thickness T1 (mm) | thickness T2 (mm) | thickness T2/ thickness T1 | thickness T3 (mm) | thickness T3/ thickness T1 | number of openings 13c (/mm$^2$) | average equivalent circle dimeter (mm) | average equivalent circle diameter/ thickness T3 | maximum opening area S1 (mm$^2$) | minimum opening area S2 (mm$^2$) | S2/S1 |
| Sample 30 | 7 | 1.00 | 0.200 | 0.200 | 0.15 | 0.150 | 5.7 | 0.25 | 1.67 | 0.054 | 0.044 | 0.82 |
| Sample 31 | 7 | 1.00 | 0.250 | 0.250 | 0.15 | 0.150 | 5.7 | 0.25 | 1.67 | 0.054 | 0.044 | 0.82 |
| Sample 32 | 7 | 1.00 | 0.250 | 0.100 | 0.03 | 0.030 | 5.7 | 0.25 | 8.33 | 0.054 | 0.044 | 0.82 |
| Sample 33 | 7 | 1.00 | 0.100 | 0.100 | 0.05 | 0.050 | 5.7 | 0.25 | 5.00 | 0.054 | 0.044 | 0.82 |
| Sample 34 | 7 | 1.00 | 0.100 | 0.100 | 0.15 | 0.150 | 5.7 | 0.25 | 1.67 | 0.054 | 0.044 | 0.82 |
| Sample 35 | 7 | 1.00 | 0.100 | 0.100 | 0.25 | 0.250 | 5.7 | 0.25 | 1.00 | 0.054 | 0.044 | 0.82 |
| Sample 36 | 7 | 0.70 | 0.100 | 0.143 | 0.15 | 0.214 | 5.7 | 0.25 | 1.67 | 0.054 | 0.044 | 0.82 |
| Sample 37 | 7 | 2.20 | 0.100 | 0.045 | 0.15 | 0.068 | 5.7 | 0.25 | 1.67 | 0.054 | 0.044 | 0.82 |
| Sample 38 | 7 | 2.50 | 0.100 | 0.040 | 0.15 | 0.060 | 5.7 | 0.25 | 1.67 | 0.054 | 0.044 | 0.82 |

TABLE 3

| | 1st layers 11a and 11b | | | | | 2nd layer 12 | | | | | |
|---|---|---|---|---|---|---|---|---|---|---|---|
| | | | | | | | | openings 13c | | | |
| | number of layers | thickness T1 (mm) | thickness T2 (mm) | thickness T2/ thickness T1 | thickness T3 (mm) | thickness T3/ thickness T1 | number of openings 13c (/mm$^2$) | average equivalent circle dimeter (mm) | average equivalent circle diameter/ thickness T3 | maximum opening area S1 (mm$^2$) | minimum opening area S2 (mm$^2$) | S2/S1 |
| Sample 39 | 9 | 1.00 | 0.020 | 0.020 | 0.08 | 0.080 | 5.7 | 0.25 | 3.13 | 0.054 | 0.044 | 0.82 |
| Sample 40 | 9 | 1.00 | 0.025 | 0.025 | 0.08 | 0.080 | 5.7 | 0.25 | 3.13 | 0.054 | 0.044 | 0.82 |
| Sample 41 | 9 | 1.00 | 0.100 | 0.100 | 0.08 | 0.080 | 5.7 | 0.25 | 3.13 | 0.054 | 0.044 | 0.82 |
| Sample 42 | 9 | 1.00 | 0.125 | 0.125 | 0.08 | 0.080 | 5.7 | 0.25 | 3.13 | 0.054 | 0.044 | 0.82 |
| Sample 43 | 9 | 1.00 | 0.050 | 0.050 | 0.03 | 0.030 | 5.7 | 0.25 | 8.33 | 0.054 | 0.044 | 0.82 |
| Sample 44 | 9 | 1.00 | 0.050 | 0.050 | 0.05 | 0.050 | 5.7 | 0.25 | 5.00 | 0.054 | 0.044 | 0.82 |
| Sample 45 | 9 | 1.00 | 0.050 | 0.050 | 0.12 | 0.120 | 5.7 | 0.25 | 2.08 | 0.054 | 0.044 | 0.82 |
| Sample 46 | 9 | 1.00 | 0.050 | 0.050 | 0.15 | 0.150 | 5.7 | 0.25 | 1.67 | 0.054 | 0.044 | 0.82 |
| Sample 47 | 9 | 0.70 | 0.050 | 0.071 | 0.10 | 0.143 | 5.7 | 0.25 | 2.50 | 0.054 | 0.044 | 0.82 |
| Sample 48 | 9 | 2.50 | 0.050 | 0.020 | 0.10 | 0.040 | 5.7 | 0.25 | 2.50 | 0.054 | 0.044 | 0.82 |

For Samples 1 to 48, the thermal conductivity in the thickness direction, the linear expansion coefficient in the intra-layer direction for a temperature change from room temperature to 800° C., and the end temperature difference, were measured.

Tables 4, 5 and 6 show the results of measurement of the thermal conductivity in the thickness direction, the linear expansion coefficient in the intra-layer direction for a temperature change from room temperature to 800° C., and the end temperature difference, of Samples 1 to 48.

TABLE 4

| | thermal conductivity in thickness direction (W/m · K) | linear expansion coefficient in intra-layer direction at room temperature to 800° C. (ppm/K) | end-portion temperature difference (° C.) |
|---|---|---|---|
| Sample 1 | 219 | 6.9 | 54.1 |
| Sample 2 | 273 | 6.7 | 55.7 |
| Sample 3 | 338 | 7.0 | 53.2 |
| Sample 4 | 338 | 7.1 | 39.8 |

TABLE 4-continued

| | thermal conductivity in thickness direction (W/m · K) | linear expansion coefficient in intra-layer direction at room temperature to 800° C. (ppm/K) | end-portion temperature difference (° C.) |
|---|---|---|---|
| Sample 5 | 338 | 7.3 | 36.2 |
| Sample 6 | 338 | 8.2 | 35.6 |
| Sample 7 | 338 | 8.4 | 34.6 |
| Sample 8 | 355 | 11.2 | 33.2 |
| Sample 9 | 352 | 8.9 | 35.5 |
| Sample 10 | 317 | 6.7 | 44.9 |
| Sample 11 | 295 | 6.6 | 45.5 |
| Sample 12 | 294 | 6.5 | 51.3 |
| Sample 13 | 301 | 6.7 | 38.8 |
| Sample 14 | 335 | 8.3 | 34.9 |
| Sample 15 | 346 | 9.2 | 32.2 |
| Sample 16 | 291 | 6.4 | 48.5 |
| Sample 17 | 302 | 6.6 | 46.7 |
| Sample 18 | 327 | 7.9 | 36.9 |
| Sample 19 | 332 | 8.2 | 35.7 |
| Sample 20 | 314 | 7.4 | 37.9 |
| Sample 21 | 336 | 7.3 | 36.5 |

TABLE 4-continued

|  | thermal conductivity in thickness direction (W/m · K) | linear expansion coefficient in intra-layer direction at room temperature to 800° C. (ppm/K) | end-portion temperature difference (° C.) |
|---|---|---|---|
| Sample 22 | 301 | 7.2 | 34.0 |
| Sample 23 | 319 | 6.9 | 43.0 |
| Sample 24 | 326 | 6.9 | 43.1 |
| Sample 25 | 344 | 7.5 | 43.0 |
| Sample 26 | 345 | 7.6 | 43.2 |

TABLE 5

|  | thermal conductivity in thickness direction (W/m · K) | linear expansion coefficient in intra-layer direction at room temperature to 800° C. (ppm/K) | end-portion temperature difference (° C.) |
|---|---|---|---|
| Sample 27 | 327 | 6.7 | 53.2 |
| Sample 28 | 327 | 6.7 | 39.6 |
| Sample 29 | 327 | 7.2 | 38.1 |
| Sample 30 | 327 | 7.9 | 36.8 |
| Sample 31 | 327 | 8.1 | 35.6 |
| Sample 32 | 353 | 9.3 | 33.2 |
| Sample 33 | 349 | 8.9 | 35.5 |
| Sample 34 | 327 | 7.2 | 37.7 |
| Sample 35 | 306 | 6.8 | 44.1 |
| Sample 36 | 314 | 7.1 | 38.5 |
| Sample 37 | 345 | 7.5 | 38.8 |
| Sample 38 | 347 | 7.6 | 38.6 |

TABLE 6

|  | thermal conductivity in thickness direction (W/m · K) | linear expansion coefficient in intra-layer direction at room temperature to 800° C. (ppm/K) | end-portion temperature difference (° C.) |
|---|---|---|---|
| Sample 39 | 337 | 6.9 | 50.8 |
| Sample 40 | 337 | 6.9 | 38.6 |
| Sample 41 | 337 | 7.9 | 36.0 |
| Sample 42 | 337 | 8.1 | 36.5 |
| Sample 43 | 351 | 9.1 | 37.4 |
| Sample 44 | 345 | 7.8 | 35.6 |
| Sample 45 | 325 | 6.9 | 37.1 |
| Sample 46 | 317 | 6.8 | 38.9 |
| Sample 47 | 319 | 6.9 | 38.3 |
| Sample 48 | 348 | 7.4 | 38.5 |

A condition that the thermal conductivity in the thickness direction is 290 W/m·K or more is herein denoted as Condition F. A condition that the linear expansion coefficient in the intra-layer direction, for a temperature change from room temperature to 800° C., is 9.0 ppm/K or less is herein denoted as Condition G. A condition that the end temperature difference is 50° C. or less is herein denoted as Condition H.

Samples 1 to 3, 8, 12, 15, 27, 32, 39 and 43 do not satisfy at least one of Conditions F to H. In contrast, the other Samples satisfy all of Conditions F to H. From this contrast therebetween, it is also demonstrated experimentally that satisfaction of all of Conditions A to D enables both a low linear expansion coefficient and a high heat dissipation capacity of composite material 10 to be achieved.

A condition that the thermal conductivity in the thickness direction is 300 W/m·K or more is herein denoted as Condition I. A condition that the linear expansion coefficient in the intra-layer direction, for a temperature change from room temperature to 800° C.; is 8.5 ppm/K or less herein denoted as Condition J. A condition that the end temperature difference is 40° C. or less is herein denoted as Condition K.

Samples 4 to 7, 13, 14, 18 to 22, 28 to 31, 34, 36 to 38, 40 to 42 and 44 to 48 further satisfy Conditions I to K. From this contrast, it is also demonstrated experimentally that further satisfaction of Condition E enables both a still lower linear expansion coefficient and a still higher heat dissipation capacity of composite material 10 to be achieved.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 10 composite material; 10a first surface; 10b second surface; 11, 11a, 11b first layer; 12, 12a, 12b second layer; 13 molybdenum plate; 13a first face; 13b second face; 13c opening; 14 copper filler; 15 thin piece; 16 block; 17 measurement sample; 20 semiconductor device; 30 case member; 40 lid; 50a, 50b terminal; 60 heat dissipation member; 70 heat generator; 80 aluminum fin; 100 semiconductor package; D opening diameter; S1 preparation step; S2 drilling step; S3 bonding step; T1, T2, T3 thickness

The invention claimed is:

1. A composite material in a plate shape having a first surface and a second surface that is an opposite surface to the first surface, the composite material comprising:
    a plurality of first layers and a plurality of second layers, wherein
    a total number of the first layers and the second layers is 5 or more,
    the first layers and the second layers are stacked alternately in a thickness direction of the composite material,
    the first surface and the second surface are each formed by the first layer,
    the first layers are formed from a metal material containing copper as a main component,
    the second layers include a molybdenum plate and a copper filler,
    the molybdenum plate has a plurality of openings extending in the thickness direction through the molybdenum plate,
    the copper filler is disposed to fill an inside of the openings,
    a thickness of the first layer forming the first surface is 0.025 mm or more and 30 percent or less of a thickness of the composite material,
    a thermal conductivity in the thickness direction at room temperature is 290 W/m·K or more, and
    a linear expansion coefficient in an intra-layer direction orthogonal to the thickness direction, for a temperature change from room temperature to 800° C., is 9.0 ppm/K or less,
    a thickness of the second layer abutting on the first layer forming the first surface is 0.05 mm or more and 35 percent or less of the thickness of the composite material, and
    in any one of the second layers,
        the number of the openings is 2 or more and 12 or less per an area of 1 mm² of the first surface, and a value determined by dividing an average equivalent circle diameter of the openings by the thickness of the second layer is 0.3 or more and 5.0 or less.

2. The composite material according to claim 1, wherein the value determined by dividing the average equivalent circle diameter of the openings by the thickness of the second layer is 1.6 or more and less than 5.0.

3. The composite material according to claim 1, wherein an end temperature difference is 50° C. or less.

4. The composite material according to claim 1, wherein
the thermal conductivity in the thickness direction at room temperature is 300 W/m·K or more, and
a linear expansion coefficient in an intra-layer direction orthogonal to the thickness direction, for a temperature change from room temperature to 800° C., is 8.5 ppm/K or less.

5. The composite material according to claim 4, wherein an end temperature difference is 40° C. or less.

6. The composite material according to claim 1, wherein
the molybdenum plate has a first face and a second face that are each an end face in the thickness direction, and
an average of respective equivalent circle diameters of the openings in the first face and an average of respective equivalent circle diameters of the openings in the second face are each 0.05 mm or more and 0.35 mm or less.

7. The composite material according to claim 1, wherein an average of respective minimum opening areas of the opening is 57 percent or more and 100 percent or less, relative to an average of respective maximum opening areas of the openings.

8. The composite material according to claim 1, wherein the total number of the first layers and the second layers is 9 or less.

9. A heat spreader comprising the composite material according to claim 1, wherein
the first surface is a contact surface to abut on a heat generation source.

10. A semiconductor package comprising:
the composite material according to claim 1; and
a semiconductor device disposed on the first surface.

11. The semiconductor package according to claim 10, further comprising a case member formed from a ceramic material, wherein
the case member is disposed on the first surface and surrounds the semiconductor device.

12. A composite material in a plate shape having a first surface and a second surface that is an opposite surface to the first surface, the composite material comprising:
a plurality of first layers and a plurality of second layers, wherein
a total number of the first layers and the second layers is 5 or more and 9 or less,
the first layers and the second layers are stacked alternately in a thickness direction of the composite material,
the first surface and the second surface are each formed by the first layer,
the first layers are formed from a metal material containing copper as a main component,
the second layers include a molybdenum plate and a copper filler,
the molybdenum plate has a plurality of openings extending in the thickness direction through the molybdenum plate,
the copper filler is disposed to fill an inside of the openings,
a thickness of the first layer forming the first surface is 0.025 mm or more and 30 percent or less of a thickness of the composite material,
a thickness of the second layer abutting on the first layer forming the first surface is 0.05 mm or more and 35 percent or less of the thickness of the composite material,
in any one of the second layers,
the number of the openings is 2 or more and 12 or less per an area of 1 mm² of the first surface, and
a value determined by dividing an average equivalent circle diameter of the openings by the thickness of the second layer is 0.3 or more and 5.0 or less,
a thermal conductivity in the thickness direction at room temperature is 290 W/m·K or more,
a linear expansion coefficient in an intra-layer direction orthogonal to the thickness direction, for a temperature change from room temperature to 800° C., is 9.0 ppm/K or less,
the molybdenum plate has a first face and a second face that are each an end face in the thickness direction,
an average of respective equivalent circle diameters of the openings in the first face and an average of respective equivalent circle diameters of the openings in the second face are each 0.05 mm or more and 0.35 mm or less, and
an average of respective minimum opening areas of the opening is 57 percent or more and 100 percent or less, relative to an average of respective maximum opening areas of the openings.

\* \* \* \* \*